United States Patent [19]

Lang et al.

[11] Patent Number: 4,645,674

[45] Date of Patent: Feb. 24, 1987

[54] GLAZE COMPOSITION FOR BAKERY PRODUCTS

[75] Inventors: Keven W. Lang, RiverVale, N.J.; George M. Eberhardt, Sayville, N.Y.; William J. Entenmann; Frank P. Shipman, both of Islip, N.Y.

[73] Assignee: Entemann's Inc., Bayshore, N.Y.

[21] Appl. No.: 628,534

[22] Filed: Jul. 6, 1984

[51] Int. Cl.$^4$ ............................................. A21D 15/08
[52] U.S. Cl. ....................................... 426/94; 426/302; 426/310; 426/653; 426/654; 426/578; 426/658; 426/549; 426/659
[58] Field of Search ................. 426/94, 302, 310, 653, 426/654, 578, 658, 549, 659

[56] References Cited

U.S. PATENT DOCUMENTS

| | | | |
|---|---|---|---|
| 1,855,818 | 4/1932 | Blinn | 426/94 |
| 3,830,941 | 8/1974 | Luft | 426/94 |
| 4,293,572 | 10/1981 | Silva | 426/94 |
| 4,309,448 | 1/1982 | Takaishi et al. | 260/397.2 |
| 4,389,420 | 6/1983 | Yang | 426/94 |
| 4,444,884 | 4/1984 | Sih | 435/55 |

FOREIGN PATENT DOCUMENTS

| | | | |
|---|---|---|---|
| 2925821 | 1/1981 | Fed. Rep. of Germany | 426/310 |
| 775835 | 5/1957 | United Kingdom | 260/397.2 |

*Primary Examiner*—Jeanette Hunter
*Attorney, Agent, or Firm*—Thomas R. Savoie; Barbara Toop D'Avanzo; Daniel J. Donovan

[57] ABSTRACT

A bakery product having a glaze on the surface thereof, said glaze comprising a dextrin component having an average D.E. of from 5 to 20. The glaze is deposited from a water dispersion or slurry onto the surface of said bakery product. The glaze composition may further comprise edible acid, a relatively low level of preservative and may optionally include a sugar.

8 Claims, No Drawings

GLAZE COMPOSITION FOR BAKERY PRODUCTS

TECHNICAL FIELD

This invention relates to a bakery product and to a composition for providing a glaze on the surface thereof.

BACKGROUND OF THE INVENTION

In the commercial production of bakery products such as breads, buns, rolls, pies, cakes and pastries, glazes, icings and frostings have customarily been applied as coatings to the surfaces of the bakery products to enhance their flavor and customer appeal. Glazes have typically been used to seal the surface of the bakery product and to provide a glossy appearance to the product in the case where the product is not completely coated with an icing and/or to serve as a barrier between the relatively high-moisture bakery product and the relatively low-moisture icing. It is well-known in the bakery industry that if icings, which typically contain about 75% sugars and 15% water, are applied onto the surface of uncoated bakery products, moisture will migrate from the bakery product to the icing thereby resulting in the icing liquifying and becoming a sticky mass which will tend to flow from the surface of the product.

Glazes are generally of two types and are applied to the surface of the bakery product either before and/or after baking. Glazes which are applied before baking are typically made of whole eggs and water and may also contain various sugars, gums and starches. These glazes seek to provide a characteristic transparent, glossy, thin film on the surface of the bakery product. These baked glazes will also impart a brownish color to the surface of the product. These egg wash glazes are not used after baking as no gloss coat would be formed. The liquid egg-coating material must be carefully maintained below 40° F. so as to reduce the development of off-flavors and microbial growth. These egg-containing glazes although widely used in the bakery trade are well-recognized as a potential source of quality control problems.

The glazes which have previously been utilized for application after baking have typically sought to replicate several egg components by the use of various starch and protein additives. These egg-free glazes usually contain one or more gums, a level of sucrose in excess of 40% by weight (dry basis) and a level of preservative (e.g., potassium sorbate) in excess of 9% by weight (dry basis). These prior art glazes have not been totally satisfactory in preventing passage of water from the baked good to any surface frosting or icing which may be applied to the glazed baked products.

SUMMARY OF THE INVENTION

Accordingly, it is a principal object of the present invention to provide a bakery product having a glaze on the surface thereof which glaze has a desirable sheen and resistance to surface stickiness.

It is another object of the present invention to provide a composition for use in furnishing a coating on bakery products which will prevent the passage of moisture between the baked product and any surface icing which is applied to the baked product; thereby resulting in an iced bakery product which has a more moist crumb and/or extended shelf life.

It is a further object of the present invention to provide an egg-free, low-sugar composition that gives a glaze appearance similar to a traditional egg-wash or sugar-wash coatings.

A more particular object of the present invention is to provide a composition for producing a glaze which is economical to formulate and to use.

An additional object of the present invention is to provide a composition for producing a glaze for bakery products which does not liquify over time when exposed to elevated humidities.

Yet another object of the present invention is to provide a surface glaze to an unbaked product similar to that of the standard egg wash glaze, that is, the development of crust color during the baking process.

These and other objects of the invention will be more particularly described in the following detailed description.

The present invention involves a glaze composition for coating bakery products thereby providing a desirable surface sheen to the product and which coating will be resistant to surface stickiness. The composition for providing the glaze comprises a dextrin component which has an average dextrose equivalent (D.E.) of from 5 to 20, preferably from 5 to 13 and most preferably from 6 to 8. The glaze composition may further comprise, in addition to water, an edible acid, a preservative and a low amount of sugar such as sucrose and/or dextrose. Typically the glaze will be coated onto either the unbaked or baked product in the form of an aqueous dispersion or slurry.

DETAILED DESCRIPTION

The dextrin component of the glaze may be composed of one or more commercially-available dextrin products each of which should have a D.E. of from 5 to 24. Each of the dextrins may be derived from any of the common cereal starches, such as corn starch, or root starches, such as tapioca starch. A suitable combination of dextrins is 3 to 5 parts by weight of a tapioca dextrin having a D.E. of from 10 to 12 and 1 part by weight of a corn maltodextrin which has a D.E. of about 5. A useful tapioca dextrin is available under the trademark "Crystal Gum" from National Starch and Chemical Corporation Bridgewater, N.J. This dextrin is understood to have a D.E. of 10 to 12. Also available is Tapioca Dextrin 11 from A. E. Staley Corporation, Decatur, Ill.

A useful corn maltodextrin is that which is sold under the trademark "Star Dri 5" by A. E. Staley Corporation, Decatur, Ill.

By employing a combination of dextrins each having a known D.E., it is possible to control the amount of solubles and insolubles, i.e., long chain saccharides, in the composition so as to arrive at an average D.E. of from 5 to 20.

It has been found desirable but not essential to add a relatively low amount of a chemical preservative or spoilage inhibitor to the glaze composition. Typically, the amount of such preservative is between about 0.10 to 1.5% by weight of the glaze composition having the water component included and between about 0.5 to 5% by weight with the water component excluded. Suitable preservatives include potassium sorbate, propionate salts and sodium benzoate. Of these, potassium sorbate is preferred. The low amount of preservative utilized in the present invention contrasts with levels of in excess of 4% (with water) and in excess of 9% (excluding water) previously used in sugared, egg-free glazes.

A small amount of an edible acid may also be included in the glaze composition of this invention to lower the pH of the composition to below about 6.0. The lowered pH results in an increase in the effectiveness of preservatives such as potassium sorbate. Suitable edible acids include citric acid, adipic acid, malic acid, and the like. Of these, citric acid is preferred and the amount thereof to be employed in the glaze composition is 0.01 to 1.5% by weight with water included.

As indicated hereinbefore, the composition essentially comprises water, one or more dextrins, a preservative and a food acid. However, to retard the rate of drying of the composition and cracking of the glaze coat after it has been applied to the surface of the bakery product it may be advantageous to include sugars, such as sucrose, in the composition. When utilized, amounts of sugars of from about 3 to 10% by weight of the composition will be included. The inclusion of sugars is particularly desirable at certain times of the year when and in some regions of the country where dry conditions prevail. In place of sucrose simple sugars such as dextrose and/or fructose may be utilized.

In addition, approved food colors, either natural or artificial or both, and flavors may be incorporated into the glaze composition. Preferably gums, fats and starches are excluded from the glaze formulations of this invention.

It was unexpectedly found that by controlling the viscosity of the glaze composition within a certain viscosity range that the composition is not as readily absorbed into the bakery product during application of the composition to the surface thereof. Moreover, control of the viscosity of the composition aids in the method of application of the composition which is generally applied to the surface of the bakery product as for example, by spraying thereon. Typically, the viscosity range of the composition is 100 to 200 cps at 27° C. Preferably, the viscosity range is 50 to 150 cps at 35° C.

According to an illustrative method for preparing the glaze composition of this invention the dextrins, sugar (if any) and preservative are added to cold water under agitation. The resulting mixture is the heated to approximately 82° C. (180° F.) before adding the acid as this helps to insure complete dispersion of a preservative such as potassium sorbate which will precipitate at a pH below about 5.2. Cooking is then completed at 93° C. (200° F.). The resulting solution is translucent and brownish in color.

The glaze compositions of this invention may be applied to the surface of bakery products in a manner similar to that in which an egg wash is applied. Thus the composition may be applied by spraying or wiping it onto the surface of the bakery product before the final baking step and/or after the final baking step. When the glaze composition is utilized both before and after baking, even more significant improvement in product quality, in terms of appearance and eating quality, can be obtained. Also the composition may be stored, preferably at temperatures of 30° to 45° C. (85° to 113° F.), until used (usually two to four hours).

The following formulations in which the percents are by weight are illustrative of some specific glaze compositions in accordance with the invention.

| | EXAMPLES | | |
|---|---|---|---|
| | 1 % | 2 % | 3 % |
| Water | 72.81 | 69.80 | 68.58 |
| Tapioca Dextrin [Crystal Gum Starch] 10,-12 D.E. | 20.11 | 19.39 | 17.81 |
| Maltodextrin [Star Dri 5] 5 D.E. | 4.95 | 4.85 | 4.45 |
| Sucrose [Granulated Sugar] | 0 | 4.85 | 8.91 |
| Potassium Sorbate | 1.02 | 0.97 | 0.22 |
| Citric Acid (5.1 pH) | 1.11 | 0.14 | 0.03 |
| | 100.00 | 100.00 | 100.00 |

Each of the formulations was prepared by slurrying the dry ingredients in cold water. Then each slurry was applied to the exterior surface of a baked bakery product by applying it at 45° C. and providing a 0.10 mm thick coating. After application, each of the glazes was noted to have a desirable sheen similar to that obtained with an egg wash glaze. Moreover, after five days storage at 25° C. and 85% relative humidity the bakery products having the glazes of the present invention were found to be free of surface stickiness. The desirable sheen and shiny surface were also noted to be retained. Glazed bakery products to which surface icing had been applied were, after five days, found to be free of icing breakdown as a result of moisture migration from the baked product. These products are also found to possess a more moist crumb over time than comparable unglazed, iced products.

This invention is not to be construed as limited to the exact details or to the compositions described as examples since obvious modifications will be apparent to those skilled in the art.

Accordingly, it will be appreciated that in accordance with the present invention a bakery product having a unique glaze composition on the surface thereof and a composition for furnishing such a glaze have been provided. While the present invention has been described with specificity with respect to particular embodiments various modifications and adaptations thereof will become apparent based on the present disclosures and are intended to be within the spirit and scope of the present invention which is to be limited only by the following appended claims.

We claim:

1. A baked, bakery product selected from the group of breads, buns, rolls, pie, cakes and pastries having a glaze coating on the surface thereof said glaze coating being egg-free and fat-free and comprised, as applied, of water, a dextrin component having an average D.E. of from 5 to 20, a chemical preservative at a level of from 0.1 to 1.5% by weight of the glaze and an edible acid in an amount effective to lower the pH of the glaze to below about 6.0 and wherein said dextrin component is comprised of from 3 to 5 parts by weight of tapioca dextrin and 1 part by weight of corn maltodextrin.

2. The glazed bakery product of claim 1 wherein the dextrin component has an average D.E. of from 5 to 13.

3. The glazed bakery product of claim 2 wherein the tapioca dextrin has a D.E. of from 10 to 12 and the corn maltodextrin has a D.E. of about 5.

4. The glazed bakery product of claim 3 wherein the glaze is sugar-free.

5. The glazed bakery product of claim 3 wherein the glaze contains from 3 to 10% by weight of sucrose, dextrose and fuctose.

6. The glazed bakery product of claim 2 wherein the glaze contains from 22.26 to 25.06% by weight of dextrin.

7. The glazed bakery product of claim 3 wherein the glaze is free of added gums.

8. A glazed bakery product in accordance with claim 1 which is further coated in whole or in part with a sugar-containing frosting or icing.

* * * * *